United States Patent
Aoki

(10) Patent No.: US 10,315,271 B2
(45) Date of Patent: Jun. 11, 2019

(54) DRESSING SYSTEM FOR ELECTRODE OF SPOT WELDING GUN

(71) Applicant: FANUC CORPORATION, Minamitsuru-gun, Yamanashi (JP)

(72) Inventor: Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 251 days.

(21) Appl. No.: 14/806,863

(22) Filed: Jul. 23, 2015

(65) Prior Publication Data
US 2016/0023296 A1  Jan. 28, 2016

(30) Foreign Application Priority Data

Jul. 23, 2014  (JP) ................................ 2014-150057

(51) Int. Cl.
| | | |
|---|---|---|
| B23K 11/30 | (2006.01) | |
| G05B 19/18 | (2006.01) | |
| B23K 11/11 | (2006.01) | |
| B23K 11/31 | (2006.01) | |
| B23B 5/16 | (2006.01) | |

(52) U.S. Cl.
CPC ......... B23K 11/3063 (2013.01); B23K 11/115 (2013.01); B23K 11/315 (2013.01); G05B 19/182 (2013.01); B23B 5/166 (2013.01); G05B 2219/45135 (2013.01); G05B 2219/45159 (2013.01)

(58) Field of Classification Search
None
See application file for complete search history.

(56) References Cited

U.S. PATENT DOCUMENTS

| 6,024,521 | A | 2/2000 | Swaggerty |
| 8,901,449 | B2 | 12/2014 | Takayama et al. |
| 2002/0072300 | A1* | 6/2002 | Kimura ................. B24B 37/005 451/5 |

(Continued)

FOREIGN PATENT DOCUMENTS

| CN | 103128433 A | 6/2013 |
| EP | 1792684 A1 | 6/2007 |

(Continued)

OTHER PUBLICATIONS

Encoder Guide, Anaheim Automation, Nov. 12, 2011, Retrieved from the Internet: <URL: http://www.anaheimautomation.com/manuels/forms/encoder-guide.php>.*

(Continued)

Primary Examiner — Kenneth M Lo
Assistant Examiner — Istiaque Ahmed
(74) Attorney, Agent, or Firm — RatnerPrestia

(57) ABSTRACT

A dressing system that can appropriately control the dressing amount of the electrode of a spot welding gun so as to not excessively and insufficiently dress the electrode. The dressing system for dressing the electrode of the spot welding gun includes a cutter that dresses the electrode, a controller that controls the rotational operation of the cutter, and a measuring part that measures the dressing amount of the electrode. The controller determines the rotational speed of the cutter based on the dressing amount measured by the measuring part.

14 Claims, 11 Drawing Sheets

(56) References Cited

U.S. PATENT DOCUMENTS

| | | | |
|---|---|---|---|
| 2005/0197051 A1* | 9/2005 | Takashima | B24B 5/04 451/49 |
| 2008/0032601 A1* | 2/2008 | Arcona | B24B 23/00 451/1 |
| 2008/0237199 A1* | 10/2008 | Phillips | B23K 11/3063 219/91.2 |
| 2015/0034608 A1* | 2/2015 | Mori | B23K 11/115 219/86.1 |

FOREIGN PATENT DOCUMENTS

| | | | |
|---|---|---|---|
| JP | H04134281 A | 5/1992 | |
| JP | 2004167558 A | 6/2004 | |
| JP | 2007-268538 A | 10/2007 | |
| JP | 2008207189 A | 9/2008 | |
| JP | 2009090316 A | 4/2009 | |
| JP | 2011218371 A | 11/2011 | |

OTHER PUBLICATIONS

Pengcheng, Q., "Optimization of tip dressing parameters based on research of electrode wear using servo gun," Feb. 2008, Dissertation submitted to Shanghai Jiao Tong University for the Degree of Master in Engineering, 74 pages (English Abstract).

* cited by examiner

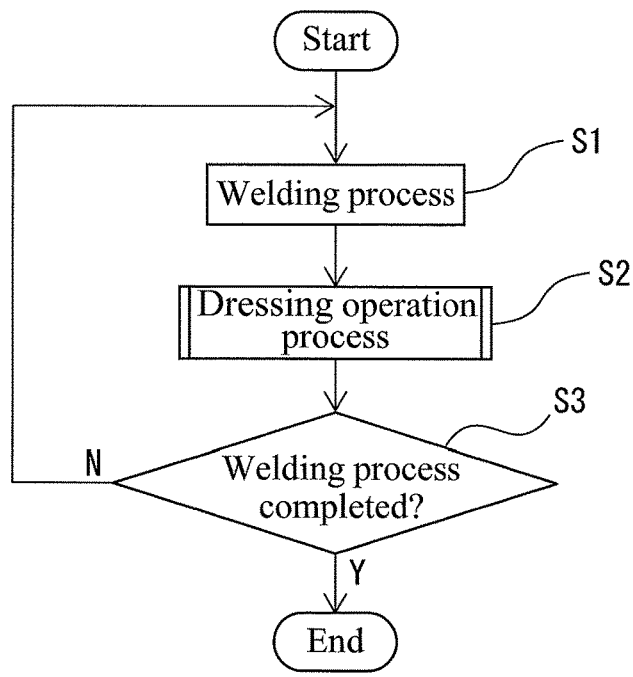
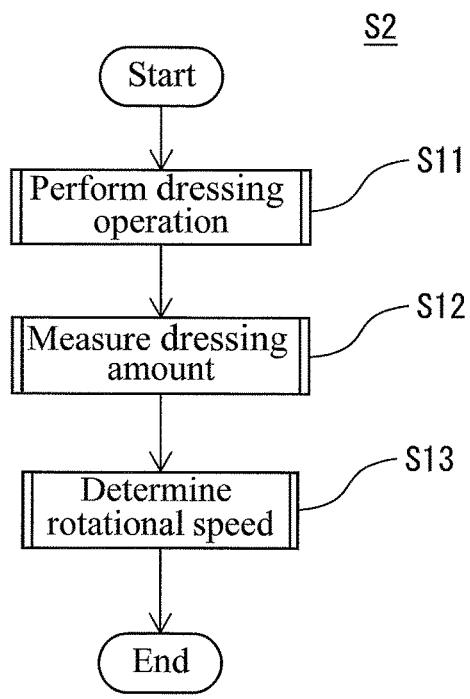

DRESSING SYSTEM FOR ELECTRODE OF SPOT WELDING GUN

BACKGROUND

1. Technical Field

The invention relates to a dressing system for dressing an electrode of a spot welding gun.

2. Description of Relevant Art

A technique is known in the art in which after the operation for dressing an electrode provided in a spot welding gun has been performed, the dressing amount is automatically measured to judge whether the result of the electrode dressing operation is good or false (e.g., Japanese Laid-open Patent Publication No. 2007-268538).

In the operation of dressing the electrode of a spot welding gun, if the electrode is dressed insufficiently, it becomes impossible to conduct a welding current through a workpiece appropriately, so the quality of welding is deteriorated. On the other hand, if the electrode is dressed excessively, the electrode is worn out quickly, whereby the electrode needs to be replaced frequently, which leads to an increase in the cost. Therefore, it has been necessary to appropriately control the dressing amount of an electrode so as to not excessively and insufficiently dress the electrode.

SUMMARY OF THE INVENTION

The dressing system for dressing an electrode of a spot welding gun includes a cutter which dresses the electrode, a controller which controls rotation of the cutter, and a measuring part which measures a dressing amount of the electrode. The controller determines the rotational speed of the cutter based on the dressing amount measured by the measuring part.

On the basis of the dressing amount measured in a first dressing operation, the controller may determine the rotational speed in a second dressing operation to be performed subsequently to the first dressing operation. The measuring part may detect an electrode position each time the dressing operation is completed.

In this case, the measuring part may measure the dressing amount by calculating a difference between the electrode position detected upon completion of the first dressing operation and the electrode position detected upon completion of a third dressing operation performed prior to the first dressing operation.

The measuring part may detect the electrode position at a plurality of time points in a period of time from the start time to the end time of the first dressing operation. In this case, the measuring part may measure the dressing amount by calculating a difference between the electrode positions detected at two of the time points which are consecutive in time series.

The above plurality of time points may be two time points at the start and the end of the first dressing operation. The measuring part may integrate the differences calculated during the period of time from the start time to the end time of the first dressing operation. The measuring part may measure the dressing amount by dividing the integrated value of the differences by the number of times that the differences are calculated.

On the basis of the dressing amount measured during performing a dressing operation, the controller may determine the rotational speed in the dressing operation after the measurement of the dressing amount. The measuring part may detect the electrode position each time a predetermined time passes after a start time of the dressing operation. In this case, the measuring part may measure the dressing amount by calculating the difference between a first electrode position detected most recently and a second electrode position detected before the first electrode position.

The measuring part may integrate the differences each time the difference is calculated. The measuring part may measure the dressing amount by dividing the integrated value of the differences by the number of times that the differences are calculated. The controller may judge whether the dressing amount measured by the measuring part is between a predetermined first threshold value and a predetermined second threshold value greater than the first threshold value.

When having determined that the dressing amount is smaller than the first threshold value, the controller may determine the rotational speed to be higher than the rotational speed at the time of measurement of the dressing amount. When having determined that the dressing amount is greater than the second threshold value, the controller may determine the rotational speed to be lower than the rotational speed at the time of measurement of the dressing amount.

When having determined that the dressing amount is smaller than the first threshold value, the controller may determine the rotational speed to be higher by a predetermined speed than the rotational speed at the time of measurement of the dressing amount. Meanwhile, when having determined that the dressing amount is greater than the second threshold value, the controller may determine the rotational speed to be lower by a predetermined speed than the rotational speed at the time of measurement of the dressing amount.

When having determined that the dressing amount is smaller than the first threshold value, the controller may determine the rotational speed to be higher than the rotational speed at the time of measurement of the dressing amount, by a speed which depends on the difference between the dressing amount and the first threshold value.

Meanwhile, when having determined that the dressing amount is greater than the second threshold value, the controller may determine the rotational speed to be lower than the rotational speed at the time of measurement of the dressing amount, by a speed which depends on the difference between the dressing amount and the second threshold value.

When having determined the rotational speed, the controller may judge whether the determined rotational speed falls within a predetermined range. When having determined that the determined rotational speed falls out of the predetermined range, the controller may determine the rotational speed to fall within the predetermined range or may not change the rotational speed.

The dressing system may further include a warning notifying part that notifies a warning to a user when the controller has judged that the determined rotational speed falls out of the predetermined range. The measuring part may detect the rotational position of a servo motor which is provided at the spot welding gun I order to move the electrode. The measuring part may measure the dressing amount based on the rotational position.

BRIEF DESCRIPTION OF THE DRAWINGS

The foregoing or other objects, features and advantages of the invention will become more apparent from the following description of preferred embodiments taken with reference to the accompanying drawings, in which:

FIG. 3 is a flow chart of an example of the welding and dressing method performed by the dressing system and the spot welding system illustrated in FIG. 2;

FIG. 4 is a flow chart of an example of the step S2 in FIG. 3;

DETAILED DESCRIPTION

Figure 1:
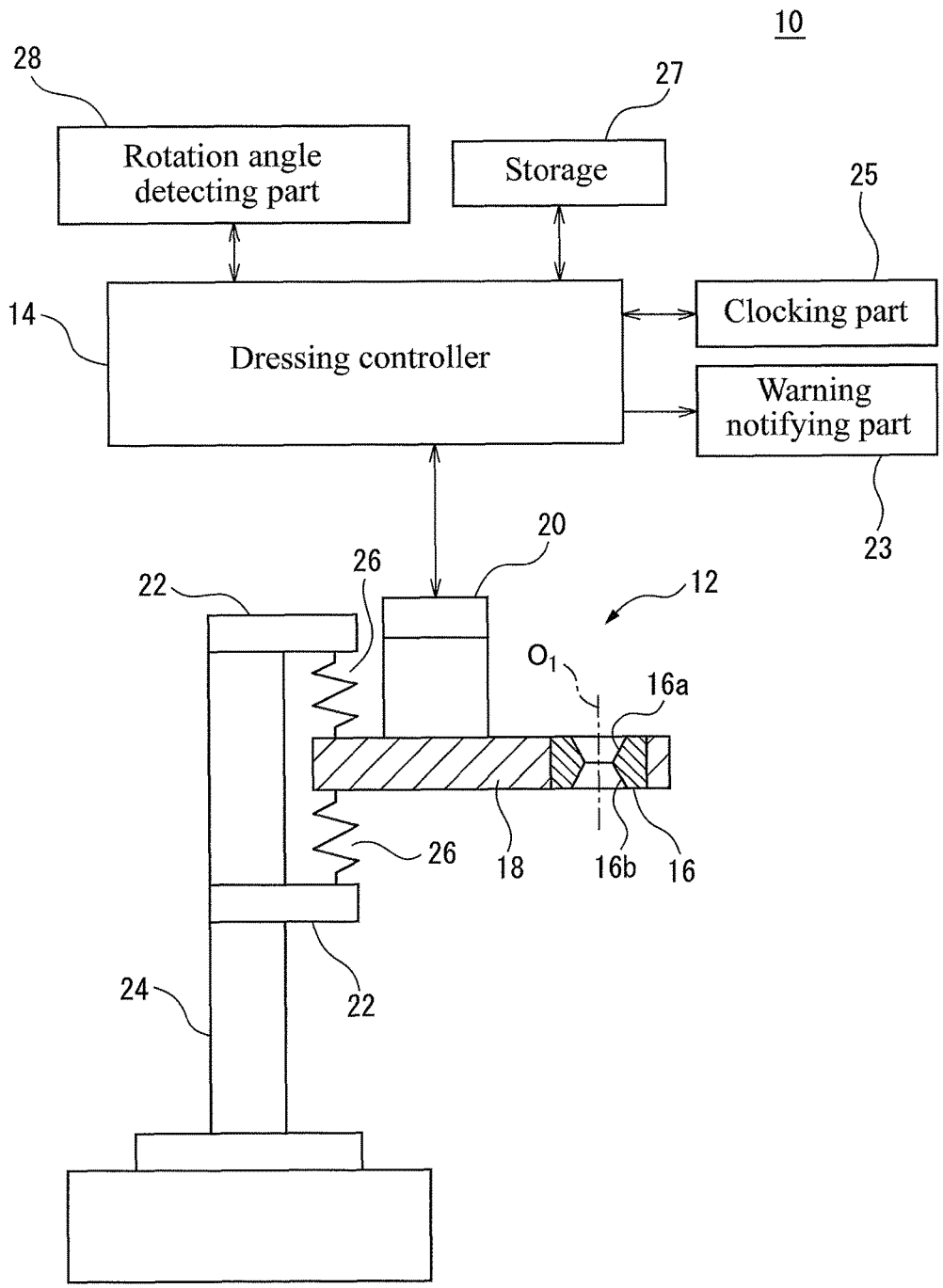
FIG. 1 is a block diagram of the dressing system according to an embodiment of the invention.

Embodiments of the invention will now be described in detail based on the drawings. First, referring to FIG. 1, the dressing system 10 according to an embodiment of the invention will be described. The dressing system 10 is for dressing an electrode of a spot welding gun described below. The dressing system 10 includes a dressing device 12, and a dressing controller 14 which controls the operation of the dressing device 12.

The dressing device 12 includes a cutter 16, a cutter support member 18, a servo motor 20, a bracket 22, and a base 24. The cutter 16 is a substantially circular-columnar member supported by the cutter support member 18 so as to be rotatable about a rotation axis $O_1$. In the present embodiment, the cutter 16 is formed with a movable electrode dressing part 16a and a fixed electrode dressing part 16b.

The cutter support member 18 is supported by the bracket 22 via springs 26 so as to be slidable upward and downward. The bracket 22 is fixed to the base 24. The base 24 is fixed on a floor of a work cell.

The servo motor 20 is fixed to the cutter support member 18. The output shaft of the servo motor 20 is mechanically connected to the cutter 16 via a motion transmitting mechanism (not shown) which is comprised of e.g. a multistage gear. The rotary motion of the output shaft of the servo motor 20 is transmitted to the cutter 16 via the motion transmitting mechanism, whereby the cutter 16 is driven to rotate about the rotation axis $O_1$.

The dressing controller 14 controls the operation of the servo motor 20. Specifically, the dressing controller 14 sends a rotation command to the servo motor 20 so as to drive the servo motor 20 to rotate in accordance with the rotation command. The dressing system 10 further includes a rotation angle detecting part 28, a storage 27, a warning notifying part 23, and a clocking part 25.

The rotation angle detecting part 28 detects the rotation angle of the servo motor mounted in a spot welding gun described below. Note that, the rotation angle detecting part 28 will be described hereinafter. The storage 27 is a non-volatile memory capable of electrically erasing and recording, which may be comprised of e.g. an EEPROM (Registered Trademark).

The dressing controller 14 communicates with the storage 27 so as to record data in the storage 27 or erase it from the storage 27. The warning notifying part 23 includes at least one of a display device, which may be comprised of a liquid crystal display, an organic EL display or the like, and a speaker. The dressing controller 14 sends a command to the warning notifying part 23 so as to notify a warning to the user by displaying a warning image on the display device and/or outputting a warning sound from the speaker.

The clocking part 25 starts or stops to clock in accordance with a command from the dressing controller 14. The dressing controller 14 can clock the elapsed time from the start of the clocking operation, with reference to a signal sent from the clocking part 25.

Next, referring to FIG. 2, the spot welding system 30 will be described. The spot welding system 30 includes a robot 32, a robot controller 34, and a spot welding gun 36. The robot 32 is e.g. a vertical articulated robot. The robot 32 includes a base 38 fixed on the floor of the work cell, and a robot arm 40 rotatably connected to the base 38.

The spot welding gun 36 is provided at the distal end of the robot arm 40 and moved by the robot arm 40. The robot controller 34 controls each element of the robot 32 and the spot welding gun 36.

The spot welding gun 36 includes a base 42, a fixed arm 44, a movable arm 46, and a servo motor 48. The base 42 is fixed to the distal end of the robot arm 40. The fixed arm 44 is arranged so that one end thereof is fixed to the base 42 and the other end thereof supports a fixed electrode 50. In the present embodiment, the fixed arm 44 extends from one end to the other end so as to be curved in a substantially L-shape.

The movable arm 46 is provided at the base 42 so as to be movable along a gun axis $O_2$. In the present embodiment, the movable arm 46 is a linearly extending rod member, the upper end (not shown) of which is mechanically connected to an output shaft (not shown) of the servo motor 48 via a motion converting mechanism (not shown), and the lower end of which supports a movable electrode 52.

The motion converting mechanism includes e.g. a timing belt and a pulley, and converts the rotary motion of the output shaft of the servo motor 48 to a reciprocating motion along the gun axis $O_2$ of the movable arm 46. The fixed electrode 50 and the movable electrode 52 are positioned on the gun axis $O_2$.

The servo motor 48 drives the movable arm 46 via the motion converting mechanism in accordance with a command from the robot controller 34. As the movable arm 46 is moved by the servo motor 48, the movable electrode 52 reciprocates along the gun axis $O_2$ in directions toward and away from the fixed electrode 50.

The fixed electrode 50 and the movable electrode 52 are energized in accordance with a command from the robot controller 34. Whereby, the fixed electrode 50 and the movable electrode 52 spot-weld a workpiece (not shown) to be welded which is held between the fixed electrode 50 and the movable electrode 52.

The robot controller 34 controls a servo motor (not shown) built in the robot arm 40 so as to operate the robot arm 40 via the servo motor. The robot controller 34 moves the spot welding gun 36 to a predetermined position by operating the robot arm 40. The dressing controller 14 is communicably connected to the robot controller 34, and can exchange information with the robot controller 34.

The rotation angle detecting part 28 includes an encoder mounted in the servo motor 48. The rotation angle detecting part 28 detects the rotation angle of the servo motor 48 and transmits it to the dressing controller 14. The dressing controller 14 can detect the position of the movable electrode 52 with respect to the fixed electrode 50 by detecting the rotational position of the servo motor 48. Note that, the rotation angle detecting part 28 may include a Hall element, instead of the encoder.

Next, referring to FIGS. 2 to 7, the welding and dressing method performed by the dressing system 10 and the spot welding system 30 will be described. FIG. 3 shows a series of welding and dressing processes. The flow shown in FIG. 3 starts when the robot controller 34 receives a command to start welding from the user. At the step S1, the robot controller 34 executes the welding process.

Specifically, the robot controller 34 operates the robot arm 40 in accordance with a robot program so as to move the spot welding gun 36 to a predetermined welding position. Then, the robot controller 34 sends a command value to the servo motor 48 so as to move the movable arm 46 toward the fixed electrode 50.

As a result, the workpiece to be welded is held between the movable electrode 52 and the fixed electrode 50. Then, the robot controller 34 energizes the movable electrode 52 and the fixed electrode 50 so as to spot-weld the workpiece.

At the step S2, the robot controller 34 and the dressing controller 14 execute the dressing operation process, while communicating with each other. The details of the step S2 will be described hereinafter. After the step S2 is completed, at the step S3, the robot controller 34 judges whether the welding process is completed. Specifically, the robot controller 34 judges whether to have executed the welding operation on all of the workpieces which have been pre-set to be welded by the user.

When judging "YES", the robot controller 34 ends the flow in FIG. 3. On the other hand, when judging "NO", the robot controller 34 returns to the step S1. Thus, the robot controller 34 repetitively executes the welding process and the dressing operation process until finishing to weld all of the workpieces which have been pre-set to be welded.

Next, referring to FIG. 4, the above step S2 will be described. When the step S2 is started, at the step S11, the robot controller 34 and the dressing controller 14 perform a dressing operation on the fixed electrode 50 and the movable electrode 52 of the spot welding gun 36, while communicating with each other.

Figure 5:
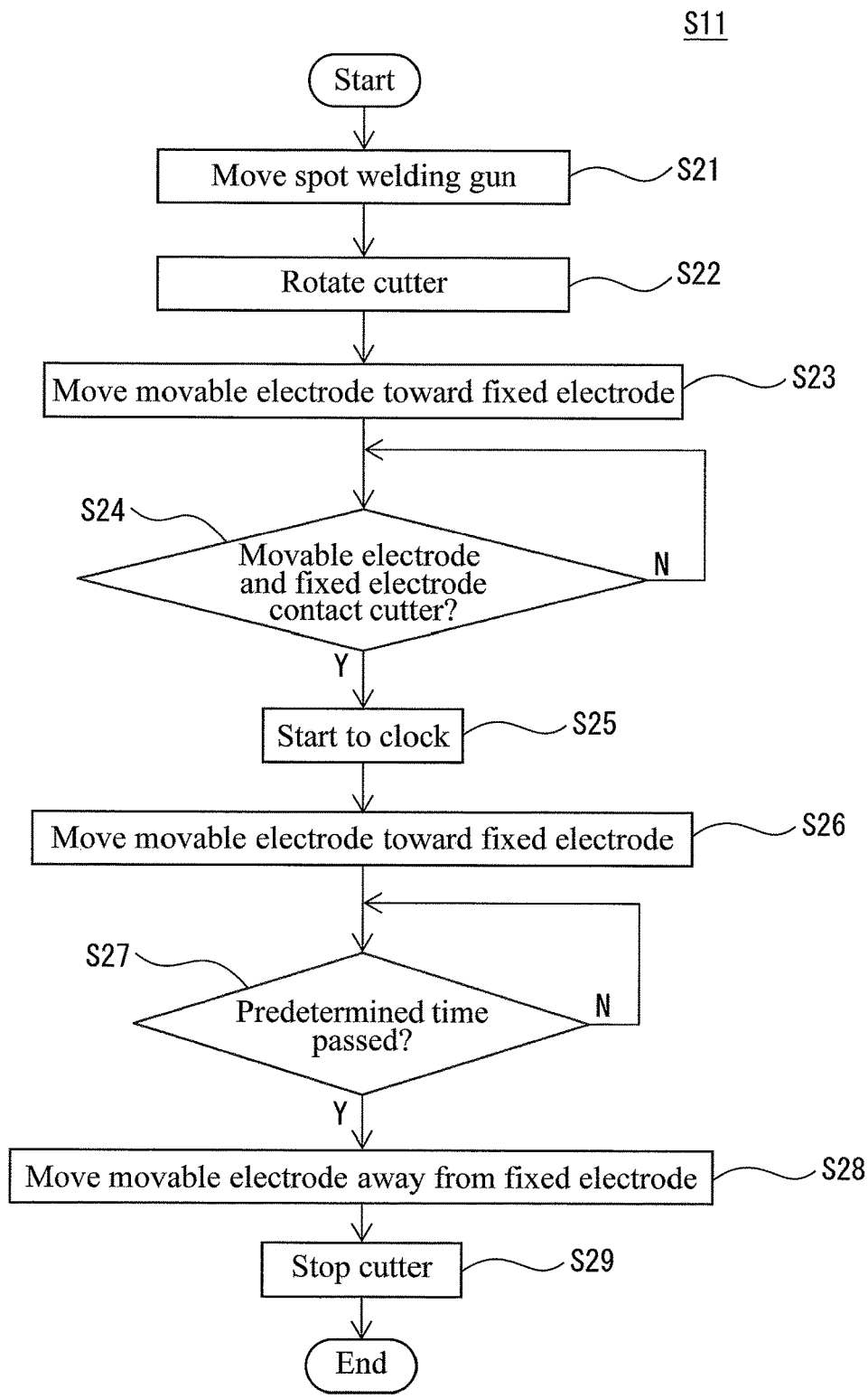
FIG. 5 is a flow chart of an example of the step S11 in FIG. 4.

The step S11 will be described below, with reference to FIG. 5. When the step S11 is started, at the step S21, the robot controller 34 operates the robot arm 40 so as to move the spot welding gun 36 from the welding position to the dressing position.

When the spot welding gun 36 is arranged at the dressing position, the cutter 16 is disposed between the movable electrode 52 and the fixed electrode 50. More specifically, the movable electrode 52 is positioned just above the movable electrode dressing part 16*a* of the cutter 16, while the fixed electrode 50 is positioned just below the fixed electrode dressing part 16*b* of the cutter 16.

At the step S22, the dressing controller 14 drives the cutter 16 to rotate. Specifically, the dressing controller 14 sends a command to the servo motor 20 so as to rotate the cutter 16 about the rotation axis $O_1$ via the servo motor 20.

At the step S23, the robot controller 34 moves the movable electrode 52 toward the fixed electrode 50. Specifically, the robot controller 34 sends a command to the servo motor 48 so as to moves the movable arm 46 so that the movable electrode 52 moves toward the fixed electrode 50.

At the step S24, the robot controller 34 judges whether the movable electrode 52 and the fixed electrode 50 contact the cutter 16. Specifically, the robot controller 34 judges whether the load torque of the servo motor 48 exceeds a predetermined torque limit. The torque limit in this case may be set to substantially zero (an infinitesimal value greater than zero).

When the load torque of the servo motor 48 exceeds the torque limit, the robot controller 34 judges that the movable electrode 52 and the fixed electrode 50 respectively contact the movable electrode dressing part 16*a* and the fixed electrode dressing part 16*b* of the cutter 16 (i.e., judges "YES"), and proceeds to the step S25.

On the other hand, when the load torque of the servo motor 48 does not exceed the torque limit, the robot controller 34 judges that the movable electrode 52 and the fixed electrode 50 do not contact the cutter 16 (i.e., judges "NO"), and repeats the step S24 until the load torque of the servo motor 48 exceeds the torque limit.

As described above, the cutter support member 18 is slidably supported via the springs 26. Accordingly, when the movable electrode 52 is moved toward the cutter 16 at the step S23 and only the movable electrode 52 contacts the movable electrode dressing part 16*a* of the cutter 16, the cutter support member 18 is moved downward.

In contrast, when only the fixed electrode 50 contacts the fixed electrode dressing part 16*b*, the cutter support member 18 is moved upward. In this case, since the load torque of the servo motor 48 never exceeds the torque limit, the robot controller 34 will not judge "YES" at the step S24.

Thus, in the present embodiment, since the cutter support member 18 is slidably supported via the springs 26, the robot controller 34 will not judge "YES" at the step S24 unless the cutter 16 is held between the movable electrode 52 and the fixed electrode 50. Therefore, if only one of the movable electrode 52 and the fixed electrode 50 contacts the cutter 16, the electrode does not be dressed.

After judging "YES" at the step S24, at the step S25, the dressing controller 14 sends a command to the clocking part 25 so as to start to clock the elapsed time from the current time point. After the start of the clocking, the clocking part 25 outputs a T-lapse trigger to the dressing controller 14 when a predetermined time T has passed. The predetermined time T is set to one second, for example.

At the step S26, the robot controller 34 sends a command to the servo motor 48 so as to move the movable electrode 52 toward the fixed electrode 50 further. At this time, the robot controller 34 may drive the servo motor 48 with a predetermined constant torque, or may change the torque of the servo motor 48 in response to a feedback from the servo motor 48.

By this operation, the cutter 16 is held between the movable electrode 52 and the fixed electrode 50, whereby the movable electrode 52 and the fixed electrode 50 are respectively pressed against the movable electrode dressing part 16*a* and the fixed electrode dressing part 16*b* of the cutter 16 by a certain pressure so as to be dressed thereby.

At the step S27, the dressing controller 14 judges whether the predetermined time T has passed from the time point when the clocking part 25 starts the clocking. Specifically, the dressing controller 14 judges whether to have received the T-lapse trigger from the clocking part 25.

The dressing controller 14 judges "YES" when having received the T-lapse trigger, and proceeds to the step S28. On the other hand, when not receiving the T-lapse trigger, the dressing controller 14 repeats the step S27 until receiving the T-lapse trigger.

At the step S28, the robot controller 34 sends a command to the servo motor 48 so as to move the movable arm 46 so that the movable electrode 52 is moved away from the fixed electrode 50. As a result, the movable electrode 52 and the fixed electrode 50 leave from the cutter 16, whereby the dressing onto the movable electrode 52 and the fixed electrode 50 is ended.

As described above, in the present embodiment, the movable electrode 52 and the fixed electrode 50 are dressed by the cutter 16 until the time T passes (i.e., over the period of time T) from the time point when having been judged "YES" at the step S24.

At the step S29, the dressing controller 14 sends a command to the servo motor 20 so as to stop the rotation of the cutter 16. In this manner, the step S11 is ended, and the flow proceeds to the step S12 in FIG. 4.

Referring again to FIG. 4, at the step S12, the dressing controller 14 measures the dressing amount of the fixed electrode 50 and the movable electrode 52. The step S12 will be described below, with reference to FIG. 6.

When the step S12 is started, at the step S31, the robot controller 34 operates the robot arm 40 so as to move the spot welding gun 36 from the dressing position to a dressing amount measuring position. When the spot welding gun 36 is arranged at the dressing amount measuring position, there is no article between the movable electrode 52 and the fixed electrode 50.

At the step S32, the robot controller 34 sends a command to the servo motor 48 so as to move the movable electrode 52 toward the fixed electrode 50. At the step S33, the robot controller 34 judges whether the movable electrode 52 contacts the fixed electrode 50.

Specifically, the robot controller 34 judges whether the load torque of the servo motor 48 exceeds a predetermined torque limit. The torque limit in this case is set to substantially zero (an infinitesimal value greater than zero).

When the load torque of the servo motor 48 exceeds the torque limit, the robot controller 34 judges that the movable electrode 52 contacts the fixed electrode 50 (i.e., judges "YES"), and proceeds to the step S34. On the other hand, when the load torque of the servo motor 48 does not exceed the torque limit, the robot controller 34 judges that the movable electrode 52 does not contact the fixed electrode 50 (i.e., judges "NO"), and repeats the step S33 until the load torque of the servo motor 48 exceeds the torque limit.

At the step S34, the dressing controller 14 detects the rotation angle of the servo motor 48. Specifically, the dressing controller 14 receives data relating to the rotation angle of the servo motor 48 from the rotation angle detecting part 28, and records the data in the storage 27. The thus acquired rotation angle of the servo motor 48 is a value indicative of the position of the movable electrode 52 with respect to the fixed electrode 50 at this time.

At the step S35, the dressing controller 14 measures the dressing amount by calculating the difference between the rotation angle of the servo motor 48 acquired in the current dressing operation process and the rotation angle of the servo motor 48 acquired in the last dressing operation procedure.

This function will be described in detail below. As illustrated in FIG. 3, the dressing system 10 and the spot welding system 30 loop the steps S1 to S3 until the entire welding process set by the user is completed.

Here, it is assumed that the nth loop is being executed at the current time point. In this case, at the step S35, the dressing controller 14 calculates the difference $\phi_n$ between the rotation angle $\theta_n$ of the servo motor 48 acquired at the nth step S34 and the rotation angle $\theta_{n-1}$ of the servo motor 48 acquired at the (n−1)th step S34.

Since the dressing amount $\xi_n$ of the fixed electrode 50 and the movable electrode 52 at the nth step S11 depends on the difference $\phi_n$, the dressing controller 14 can obtain the dressing amount $\xi_n$ by calculating the difference $\phi_n$.

Thus, in the present embodiment, the dressing controller 14 detects the rotation angle of the servo motor 48 (i.e., the position of the movable electrode 52 with respect to the fixed electrode 50) via the rotation angle detecting part 28 each time the step S11 is completed.

Then, the dressing controller 14 measures the dressing amount $\xi_n$ of the fixed electrode 50 and the movable electrode 52 dressed at the current step S11, by detecting the difference $\phi_n$ between the rotation angles detected in the current loop and the last loop. Thus, the dressing controller 14 and the rotation angle detecting part 28 function as a measuring part which measures the dressing amount of the electrodes 50 and 52.

Note that, if the first loop is being executed, at the step S35, the dressing controller 14 may calculate the difference $\phi_1$ between the rotation angle $\theta_1$ of the servo motor 48 acquired at the first step S34 and the reference rotation angle $\theta_{ref}$ pre-recorded in the storage 27. The reference rotation angle $\theta_{ref}$ may be acquired by the user in an empirical or statistical manner.

At the step S36, the robot controller 34 sends a command to the servo motor 48 so as to move the movable arm 46 so that the movable electrode 52 is moved away from the fixed electrode 50. In this manner, the step S12 is ended, and the flow proceeds to the step S13 in FIG. 4.

Referring again to FIG. 4, at the step S13, the dressing controller 14 determines the rotational speed of the cutter 16. The step S13 will be described below, with reference to FIG. 7. When the step S13 is started, at the step S41, the dressing controller 14 judges whether the dressing amount $\xi_n$ measured at the step S35 is smaller than the first threshold value. The first threshold value is pre-recorded in the storage 27.

Specifically, the dressing controller 14 compares the difference $\phi_n$ measured at the step S35 with the first threshold value $\alpha_1$. When the difference $\phi_n$ is smaller than the first threshold value $\alpha_1$ (i.e., $\phi_n < \alpha_1$), the dressing controller 14 judges "YES", and proceeds to the step S42. On the other hand, when the difference $\phi_n$ is greater than or equal to the first threshold value $\alpha_1$ (i.e., $\phi_n \geq \alpha_1$), the dressing controller 14 judges "NO", and proceeds to the step S44.

At the step S42, the dressing controller 14 determines the rotational speed of the cutter 16 so that the rotational speed of the cutter 16 in a next dressing operation which will be performed next time becomes higher than the rotational speed of the cutter 16 in the current dressing operation which is being performed at this time. More specifically, it is assumed that the nth step S2 is being executed at the current time point and the cutter 16 have been rotated by a rotational speed $v_n$.

In this case, at this step S42, the dressing controller 14 changes the command value for the servo motor 20 which determines the rotational speed of the cutter 16 so that the rotational speed of the cutter 16 in (n+1)th step S11 which will be executed for the (n+1)th time is increased from $v_n$ to $v_{n+1}$ ($>v_n$). Then, the dressing controller 14 records the changed command value in the storage 27.

When the (n+1)th step S2 is executed, at the step S22, the dressing controller 14 reads out the changed command value from the storage 27, and sends it to the servo motor 20 so as to rotate the cutter 16 at the rotational speed $v_{n+1}$.

As an example for increasing the rotational speed, the rotational speed $v_{n+1}$ is set to a speed obtained by adding a constant c1 to the rotational speed $v_n$ (i.e., $v_{n+1}=v_n+c_1$). In this instance, since the dressing controller 14 can change the rotational speed of the cutter 16 in a stepwise manner, it is possible to easily manage the change of the rotational speed of the cutter 16.

Alternatively, as another example, the rotational speed $v_{n+1}$ is set to a speed obtained by adding a variable $f(\delta_1)$, which depends on the difference $\delta_1$ between the dressing amount and the first threshold value, to the rotational speed $v_n$ (i.e., $v_{n+1}=v_n+f(\delta_1)$). The variable $f(\delta_1)$ is a function of $\delta_1$, which may be defined as $f(\delta_1)=c_2\delta_1$ ($c_2$ is a constant), for example.

In this case, if the dressing amount $\xi_n$ (i.e., the difference $\phi_n$) is significantly smaller than the first threshold value ($\alpha_1$), the dressing controller 14 can significantly increase the rotational speed in response. On the other hand, if the dressing amount $\xi_n$ slightly exceeds the first threshold value ($\alpha_1$), it is possible to make the increment of the rotational speed to be smaller. Due to this, it is possible to change the rotational speed so as to be suitable for the desired dressing amount.

When judged "NO" at the step S41, at the step S44, the dressing controller 14 judges whether the dressing amount $\xi_n$ measured at the step S35 is greater than the second threshold value. The second threshold value is pre-recorded in the storage 27.

Specifically, the dressing controller 14 compares the difference $\phi_n$ measured and stored at the step S35 with the second threshold value $\beta_1$. When the difference $\phi_n$ is greater than the second threshold value $\beta_1$ (i.e., $\phi_n>\beta_1$), the dressing controller 14 judges "YES", and proceeds to the step S45. On the other hand, when the difference $\phi_n$ is smaller than or equal to the second threshold value $\beta_1$ (i.e., $\phi_n\leq\beta_1$), the dressing controller 14 judges "NO", and ends the flow shown in FIG. 7.

At the step S45, the dressing controller 14 determines the rotational speed of the cutter 16 so that the rotational speed of the cutter 16 in a next dressing operation which will be performed next time becomes lower than the rotational speed of the cutter 16 in the current dressing operation which is currently performed. More specifically, it is assumed that the nth step S2 is being executed at the current time point and the cutter 16 have been rotated at the rotational speed $v_n$.

In this case, at this step S45, the dressing controller 14 changes the command value which determines the rotational speed of the cutter 16 so that the rotational speed of the cutter 16 in (n+1)th step S11 which will be executed for the (n+1)th time is decreased from $v_n$ to $v_{n+1}$ ($<v_n$). Then, the dressing controller 14 records the changed command value in the storage 27.

As an example, the rotational speed $v_{n+1}$ is set to a speed obtained by subtracting a constant $c_3$ from the rotational speed $v_n$ (i.e., $v_{n+1}=v_n-c_3$). Alternatively, as another example, the rotational speed $v_{n+1}$ is set to a speed obtained by subtracting a variable $f(\delta_2)$, which depends on the difference $\delta_2$ between the dressing amount and the second threshold value, from the rotational speed $v_n$ (i.e., $v_{n+1}=v_n-f(\delta_2)$). The variable $f(\delta_2)$ is a function of the difference $\delta_2$, which may be defined as $f(\delta_2)=c_4\delta_2$ ($c_4$ is a constant), for example.

When (n+1)th step S2 is executed, at the step S22, the dressing controller 14 reads out the changed command value from the storage 27, and sends it to the servo motor 20 so as to rotate the cutter 16 at the rotational speed $v_{n+1}$.

Thus, in the present embodiment, the dressing controller 14 changes the rotational speed for (n+1)th dressing operation which will be performed for the (n+1)th time, when judging that the dressing amount $\xi_n$ (i.e., the difference $\phi_n$) is smaller than the first threshold value ($\alpha_1$) or greater than the second threshold value ($\beta_1$).

On the other hand, the dressing controller 14 does not change the rotational speed $v_n$ in the nth dressing operation but maintains the rotational speed to $v_n$, when judging that the dressing amount is in the range between the first threshold value and the second threshold value. In this case, (n+1)th dressing operation to be performed for the (n+1) time is also performed with the same rotational speed $v_n$ as in the nth dressing operation.

When the rotational speed of the cutter 16 is changed at the step S42 or the step S45, at the step S43, the dressing controller 14 judges whether the changed rotational speed $v_{n+1}$ falls within a predetermined range.

Specifically, the upper limit $v_{max}$ and the lower limit $v_{min}$ of the rotational speed of the cutter 16 are pre-stored in the storage 27. The dressing controller 14 judges whether the changed rotational speed $v_{n+1}$ falls within the range from $v_{min}$ to $v_{max}$ (i.e., $v_{min}\leq v_{n+1}\leq v_{max}$).

When the changed rotational speed $v_{n+1}$ falls within the range from $v_{min}$ to $v_{max}$, the dressing controller 14 judges "YES", and ends the flow of the step S13. On the other hand, when the changed rotational speed $v_{n+1}$ is out of the range from $v_{min}$ to $v_{max}$ (i.e., $v_{n+1}<v_{min}$ or $v_{n+1}>v_{max}$), the dressing controller 14 judges "NO", and proceeds to the step S46.

At the step S46, the dressing controller 14 changes the rotational speed $v_n$ at the current time point so as to be within the range from $v_{min}$ to $v_{max}$. As an example, when the rotational speed $v_n$ at the current time point is increased at the step S42, as a result of which the rotational speed exceeds the upper limit $v_{max}$, the dressing controller 14 changes the rotational speed from $v_n$ to $v_{max}$ at this step S46.

Or when the rotational speed $v_n$ at the current time point is decreased at the step S45, as a result of which the rotational speed becomes lower than the lower limit $v_{min}$, the dressing controller 14 changes the rotational speed from $v_n$ to $v_{min}$ at this step S46.

As another example, when judging that the changed rotational speed $v_{n+1}$ is out of the range from $v_{min}$ to $v_{max}$, the dressing controller 14 may not change the rotational speed of the cutter 16. In this case, when performing (n+1)th step S2, the dressing controller 14 rotates the cutter 16 at the same rotational speed $v_n$ as in the nth step S2. By this step S46, it is possible to prevent the cutter 16 from rotating at an abnormal rotation speed.

At the step S47, the dressing controller 14 notifies the warning, which indicates that the changed rotational speed $v_{n+1}$ is out of a predetermined range, to the user via the warning notifying part 23. The warning notifying part 23 notifies the warning to the user by displaying the warning image on the display or outputting the warning sound from the speaker, in accordance with a command from the dressing controller 14. By this step S47, the user can understand that the cutter 16 rotates at a rotational speed which is the same as or close to the upper limit or the lower limit.

As described above, according to the present embodiment, the dressing controller 14 measures the dressing amount of the fixed electrode 50 and the movable electrode 52 during the dressing operation, and determines the rotational speed of the cutter 16 so as to increase, decrease or maintain, on the basis of the dressing amount. Due to this feature, since the dressing controller 14 can flexibly control the rotational speed of the cutter 16 based on the dressing amount $\xi_n$, it is possible to appropriately control the dressing amount.

Specifically, in the present embodiment, the dressing controller 14 measures the dressing amount each time the dressing operation is completed, and increases the rotational speed for the (n+1)th dressing operation when judging that the dressing amount $\xi_n$ in the nth dressing operation is small, whereby making it possible to increase the dressing amount in the (n+1)th dressing operation.

On the other hand, when judging that the dressing amount $\xi_n$ in the nth dressing operation is large, the dressing controller 14 decreases the rotational speed for the (n+1)th dressing operation, whereby making it possible to decrease the dressing amount in the (n+1)th dressing operation.

Accordingly, it is possible to appropriately adjust a dressing amount in subsequent dressing operations in response to the dressing amount in the current dressing operation, whereby it is possible to dress the movable electrode 52 and the fixed electrode 50 not excessively and not insufficiently. As a result, the electrodes can be dressed in such a manner as to maintain the quality of welding while preventing the electrode from being worn quickly.

Figure 6:
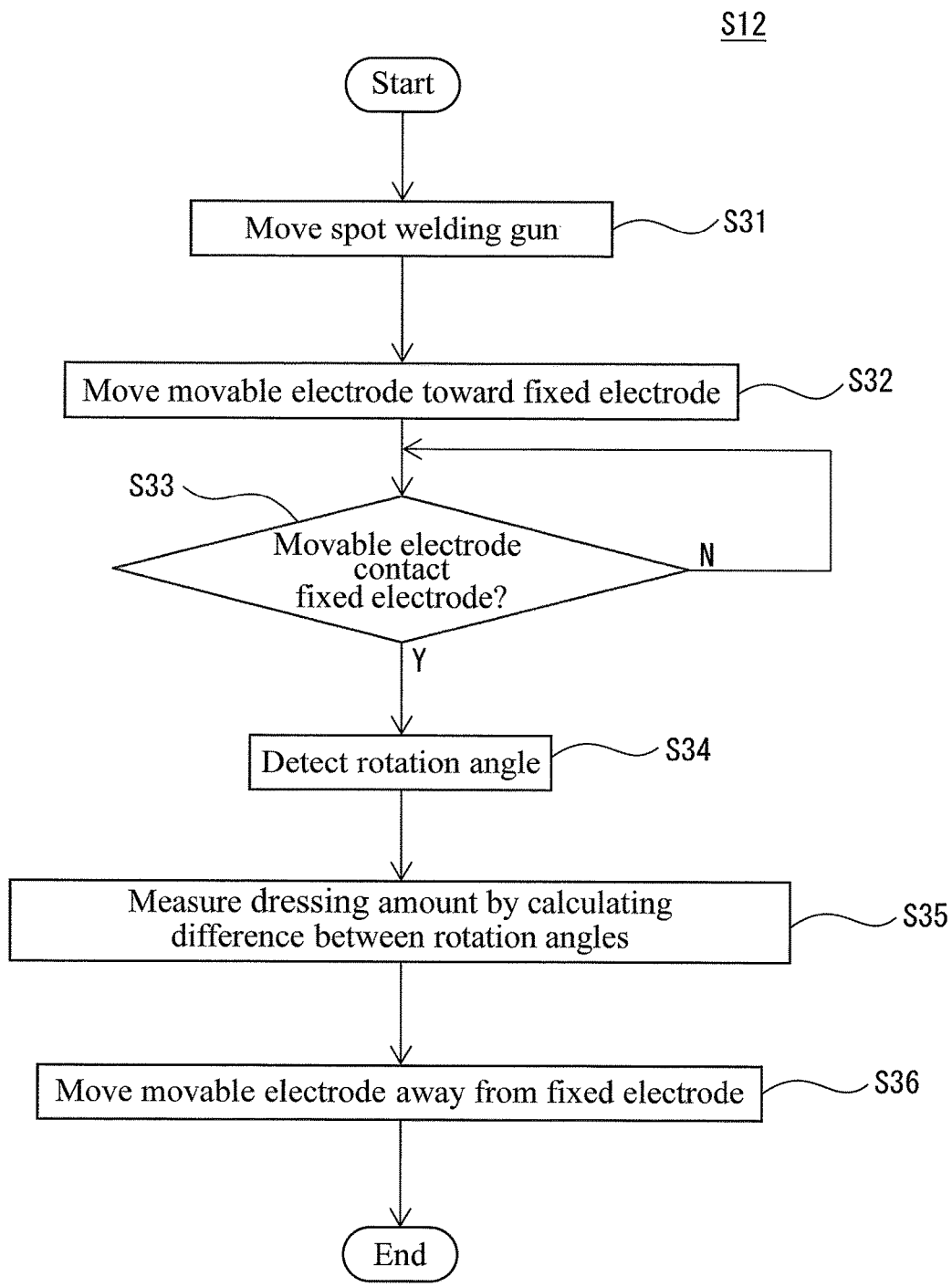
FIG. 6 is a flow chart of an example of the step S12 in FIG. 4.
Figure 7:
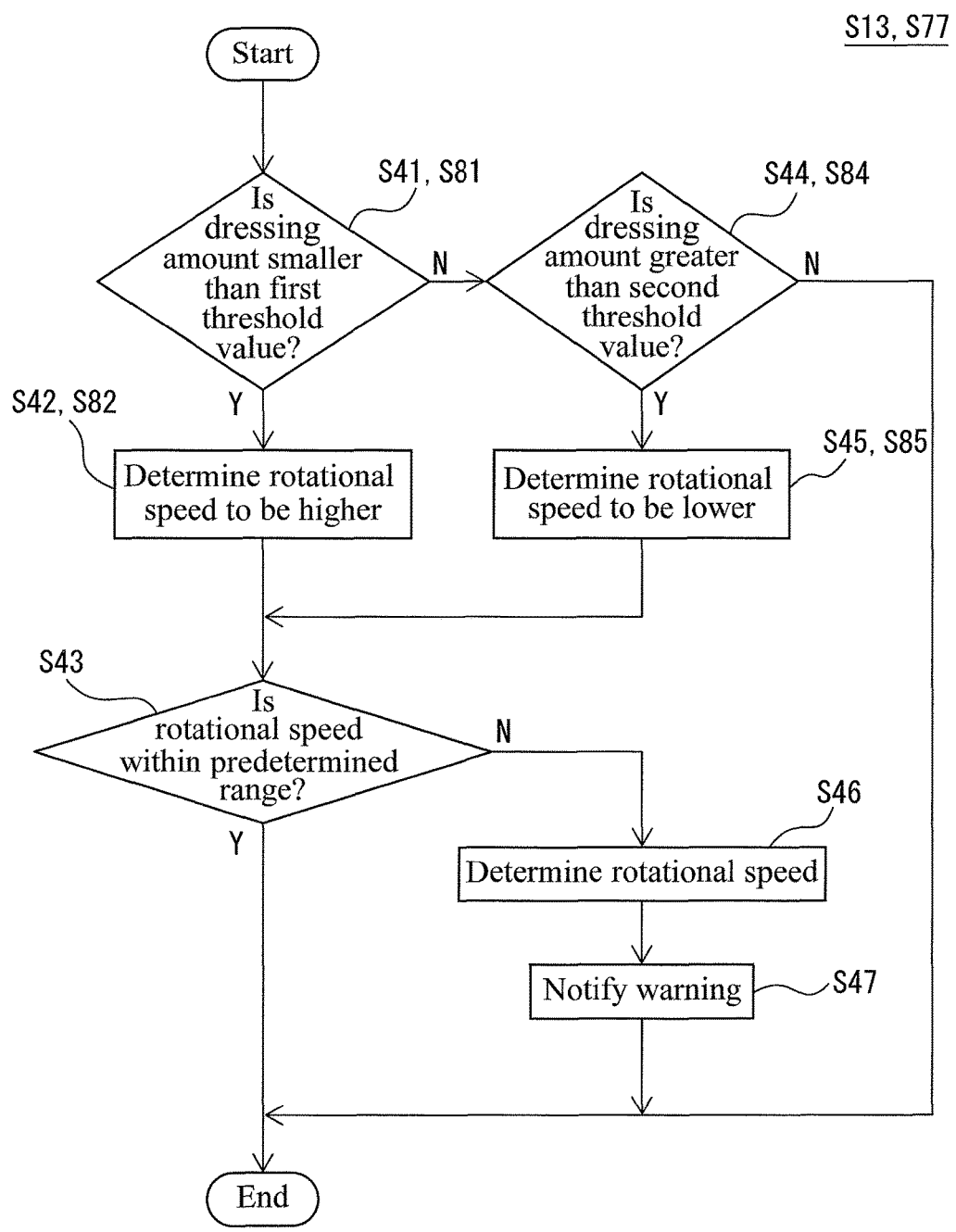
FIG. 7 is a flow chart of an example of the step S13 in FIG. 4 and the step S77 in FIG. 10.

Note that, instead of the flow of the step S12 shown in FIG. 6, various methods for measuring the dressing amount can be employed. As an example, the robot controller 34 moves the movable electrode 52 to be pressed against a plate (not shown) fixed at a predetermined position, and receives the rotation angle of the servo motor 48 at this time. Thus, the robot controller 34 acquires the data of the rotation angle as a value indicative of the position of the movable electrode 52 with respect to the plate.

Then, the dressing controller 14 may measure the dressing amount of the movable electrode 52 by calculating the difference between the rotation angle of the servo motor 48 acquired in the current dressing operation and the rotation angle of the servo motor 48 acquired in the previous dressing operation. Further, the dressing controller 14 may calculate the dressing amount of the fixed electrode 50 by subtracting the dressing amount of the movable electrode 52 from the dressing amount acquired by the flow shown in FIG. 6.

As another example, the dressing system 10 may include an imaging apparatus. In this case, the dressing controller 14 may acquire image data of the movable electrode 52 or the fixed electrode 50 imaged by the imaging apparatus in the current dressing operation process. Then, the dressing controller 14 may measure the length of each electrode by analyzing the image data.

Then, the dressing controller 14 may analyze the image data of the movable electrode 52 or the fixed electrode 50 imaged by the imaging apparatus in the previous dressing operation process, so as to measure the length of each electrode. Then, the dressing controller 14 may measure the dressing amount of each electrode by subtracting the current length of the electrode from the previous length of the electrode. Thus, various methods for measuring the electrode position or the electrode length are publicized as prior art. Therefore, the dressing controller 14 may measure the dressing amount with any known method.

Figure 8:
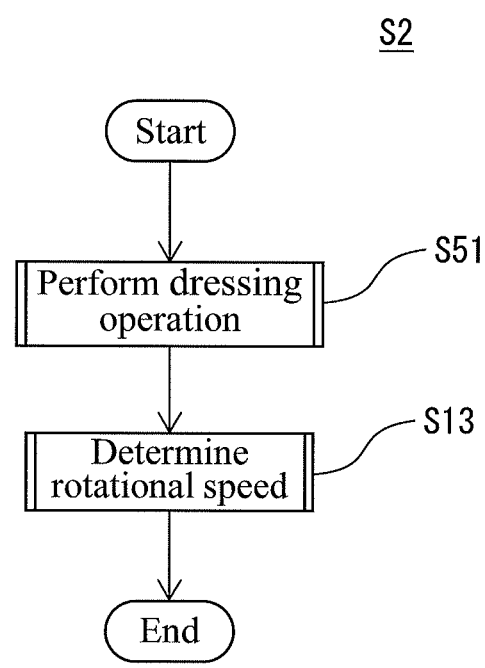
FIG. 8 is a flow chart of another example of the step S2 in FIG. 3.

Next, referring to FIGS. 8 and 9, an alternative example of the step S2 shown in FIG. 3 will be described. When the step S2 shown in FIG. 8 is started, at the step S51, the robot controller 34 and the dressing controller 14 perform a dressing operation onto the fixed electrode 50 and the movable electrode 52 of the spot welding gun 36 while communicating with each other.

The step S51 will be described below with reference to FIG. 9. Note that, since the steps S21 to S29 shown in FIG. 9 are similar to those of the above-described embodiment, a detailed description thereof is omitted. After judging "YES" at the step S24, the dressing controller 14 executes the step S61 in parallel with the above-mentioned step S25. At this step S61, the dressing controller 14 detects the rotation angle $\theta_S$ of the servo motor 48 via the rotation angle detecting part 28, and records it in the storage 27.

The rotation angle $\theta_S$ acquired at the step S61 indicates the rotation angle of the servo motor 48 (i.e., the position of the movable electrode 52 with respect to the fixed electrode 50) at the time when the movable electrode 52 and the fixed electrode 50 contact the cutter 16 without substantial pressure, i.e., when the dressing onto the movable electrode 52 and the fixed electrode 50 is actually started.

After judging "YES" at the step S27, the dressing controller 14 executes the steps S62 and S63 in parallel with the above-mentioned steps S28 and S29. At the step S62, similar as the step S61, the dressing controller 14 detects a rotation angle $\theta_E$ of the servo motor 48 via the rotation angle detecting part 28, and records it in the storage 27.

The rotation angle $\theta_E$ acquired at the step S62 is a value indicative of the rotation angle of the servo motor 48 (i.e., the position of the movable electrode 52 with respect to the fixed electrode 50) at the time when a predetermined time T have passed from the start time of dressing onto the movable electrode 52 and the fixed electrode 50 in the step S24, i.e., when the dressing onto the movable electrode 52 and the fixed electrode 50 is ended.

At the step S63, the dressing controller 14 calculates the difference $\phi_{SE}$ between the rotation angle $\theta_S$ acquired at the step S61 and the rotation angle $\theta_E$ acquired at the step S62.

Since the dressing amount $\xi_{SE}$ of the fixed electrode 50 and the movable electrode 52 dressed from the start time to the end time of the dressing depends on the difference $\phi_{SE}$, the dressing controller 14 can obtain the dressing amount $\xi_{SE}$ by calculating the difference $\phi_{SE}$.

Thus, in the present embodiment, the dressing controller 14 measures the dressing amount $\xi_{SE}$ of the fixed electrode 50 and the movable electrode 52 dressed in the step S51 by detecting the difference $\phi_{SE}$ between the rotation angles detected at the start and end of the dressing.

Then, as shown in FIG. 8, the dressing controller 14 performs the above-mentioned step S13, after the step S51. Specifically, the dressing controller 14 judges whether the dressing amount $\xi_{SE}$ (e.g., the difference $\phi_{SE}$) is within the range between the first threshold value ($\alpha_2$) and the second threshold value ($\beta_2$) (i.e. $\alpha_2 \leq \phi_{SE} \leq \beta_2$), at the steps S41 and S44.

When judging that the dressing amount $\xi_{SE}$ is smaller than the first threshold value or greater than the second threshold value at the step S41 or S44, the dressing controller 14 changes the rotational speed for the subsequent dressing operation which will be performed for the (n+1)th time.

On the other hand, when judging that the dressing amount $\xi_n$ is within the range between the first threshold value and the second threshold value, the dressing controller 14 does not change the rotational speed $v_n$ in the nth dressing operation but maintains it.

According to the present embodiment, the dressing controller 14 can measure the dressing amount by detecting the difference $\phi_{SE}$ between the rotation angles at the start and the end of the dressing operation, and can appropriately adjust the dressing amount in the subsequent dressing operations in response to the measured dressing amount. Therefore, the movable electrode 52 and the fixed electrode 50 can be dressed not excessively and not insufficiently. As a result, it is possible to dress the electrode so as to maintain the quality of welding while preventing the electrode from being worn quickly.

Figure 10:
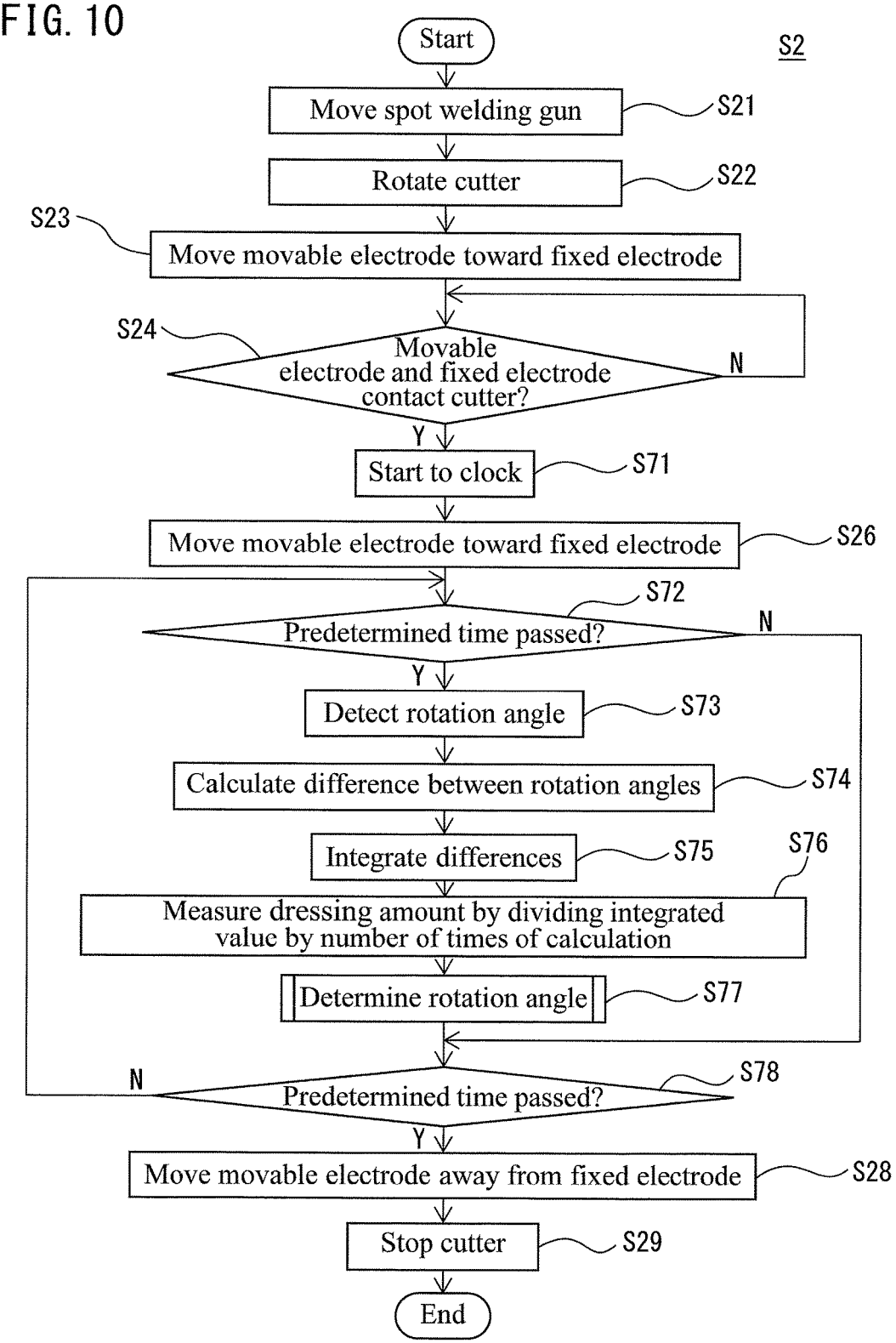
FIG. 10 is a flow chart of still another example of the step S2 in FIG. 3.

Next, referring next to FIG. 10, a still another example of the step S2 shown in FIG. 3 will be described. Note that, since the steps S21 to S24, S26, S28 and S29 shown in FIG. 10 are similar to those in the above-described embodiment, a detailed explanation thereof is omitted.

When judging "YES" at the step S24, at the step S71, the dressing controller 14 sends a command to the clocking part 25 so as to start to clock the elapsed time from this time point. In the present embodiment, the clocking part 25 outputs a τ-lapse trigger to the dressing controller 14 each time a predetermined time τ have passed after the start of the clocking operation.

The predetermined time τ may be set to e.g. 0.1 second. Further, the clocking part 25 outputs a T-lapse trigger to the dressing controller 14 when a predetermined time T (T>τ) have passed after the start of the clocking operation.

At the step S2 according to the present embodiment, the dressing controller 14 loops the steps S72 to S78 at a cycle τ until the time T passes after the clocking operation is started at the step S71. The operation at the steps S72 to S78 in m-th loop will be described below.

After the step S26, at the step S72, the dressing controller 14 judges whether to have received the m-th τ-lapse trigger from the clocking part 25. When the m-th τ-lapse trigger has been received, the dressing controller 14 judges "YES", and proceeds to the step S73. On the other hand, when the m-th τ-lapse trigger has not been received, the dressing controller 14 judges "NO", and proceeds to the step S27.

At the step S73, the dressing controller 14 detects the rotation angle $\theta_{m\tau}$ of the servo motor 48 via the rotation angle detecting part 28, and records it in the storage 27. At the step S74, the dressing controller 14 calculates the difference $\phi_m$ between the rotation angle $\theta_{m\tau}$ of the servo motor 48 detected at the most recent (i.e., the m-th) step S73 and the rotation angle $\theta_{(m-1)\tau}$ of the servo motor 48 detected at the (m−1)th step S73, and records the calculated difference $\phi_m$ in the storage 27.

At the step S75, the dressing controller 14 integrates all of the differences $\phi_1, \phi_2, \phi_3, \ldots \phi_m$ which have been calculated up to the current time point so as to calculate the integrated value $\Sigma\phi=\phi_1+\phi_2+\phi_3+\ldots+\phi_m$. Then, the dressing controller 14 records the integrated value $\Sigma\phi$ thus calculated in the storage 27.

At the step S76, the dressing controller 14 calculates an average dressing amount $\xi_{ave}=\Sigma\phi/m$ obtained by dividing the integrated value $\Sigma\phi$ calculated at step S75 by the number of times "m" that the differences $\phi_1-\phi_m$ have been calculated up to the current time point, and records the calculated average dressing amount $\xi_{ave}$ in the storage 27. In the present embodiment, the dressing controller 14 measures the average dressing amount $\xi_{ave}$ of the fixed electrode 50 and the movable electrode 52, and determines the rotational speed of the cutter 16 based on the average dressing amount $\xi_{ave}$ as described hereinafter.

Then, at the step S77, the dressing controller 14 determines the rotational speed of the cutter 16. This step S77 will be described below, with reference to FIG. 7. When the step S77 is started, at the step S81, the dressing controller 14 judges whether the average dressing amount $\xi_{ave}$ measured at the step S76 is smaller than a first threshold value $\alpha_3$ (i.e., $\xi_{ave}<\alpha_3$).

This first threshold value $\alpha_3$ is pre-recorded in the storage 27. When the average dressing amount $\xi_{ave}$ is smaller than the first threshold value $\alpha_3$, the dressing controller 14 judges "YES", and proceeds to the step S82. On the other hand, when the average dressing amount $\xi_{ave}$ is greater than or equal to the first threshold value $\alpha_3$ (i.e., $\xi_{ave} \geq \alpha_3$), the dressing controller 14 judges "NO", and proceeds to the step S84.

At the step S82, the dressing controller 14 determines the rotational speed of the cutter 16 so as to be higher than the rotational speed at the current time point. Specifically, it is assumed that the rotational speed of the cutter 16 is $v_{m-1}$ at the start of the m-th step S77.

In this case, at this step S82, the dressing controller 14 changes the command value for the servo motor 20 which determines the rotational speed of the cutter 16 so as to increase the rotational speed of the cutter 16 from $v_{m-1}$ to $v_m$ ($>v_{m-1}$), and sends the changed command value to the servo motor 20. The servo motor 20 receives the changed command value and increases the rotational speed of the cutter 16 from $v_{m-1}$ to $v_m$.

As an example of increasing the rotational speed, the changed rotational speed $v_m$ may be set to a speed obtained by adding a constant $c_5$ to the rotational speed $v_{m-1}$ (i.e., $v_m=v_{m-1}+c_5$), similar as the above-described embodiment. Alternatively, the changed rotational speed $v_m$ may be set to a speed obtained by adding a variable $f(\delta_3)$, which depends on the difference $\delta_3$ between the average dressing amount $\xi_{ave}$ and the first threshold value $\alpha_3$, to the rotational speed $v_{m-1}$ (i.e., $v_m=v_{m-1}+f(\delta_3)$).

On the other hand, when judging "NO" at the step S81, at the step S84, the dressing controller 14 judges whether the average dressing amount $\xi_{ave}$ measured at the step S76 is greater than a second threshold value $\beta_3$ (i.e., $\xi_{ave}>\beta_3$). This second threshold value $\beta_3$ is pre-stored in the storage 27.

When the average dressing amount $\xi_{ave}$ is greater than the second threshold value $\beta_3$, the dressing controller 14 judges "YES", and proceeds to the step S85. On the other hand, when the average dressing amount $\xi_{ave}$ is smaller than or equal to the second threshold value $\beta_3$ (i.e., $\xi_{ave} \leq \beta_3$), the dressing controller 14 judges "NO", and ends the flow of the step S77.

At the step S85, the dressing controller 14 determines to decrease the rotational speed of the cutter 16 in the current dressing operation which is being performed at this time. Specifically, the dressing controller 14 changes the command value for the servo motor 20 which determines the rotational speed of the cutter 16 so as to decrease the rotational speed of the cutter 16 from $v_{m-1}$ to $v_m$ ($<v_{m-1}$), and sends the changed command value to the servo motor 20.

The servo motor 20 receives the changed command value and changes the rotational speed of the cutter 16 from $v_{m-1}$ to $v_m$. After the step S82 or S85, the dressing controller 14 sequentially performs the above-mentioned steps S43, S46, and S47, and ends the step S77 shown in FIG. 7.

Referring again to FIG. 10, at the step S78, the dressing controller 14 judges whether to have received the T-lapse trigger from the clocking part 25. When having received the T-lapse trigger, the dressing controller 14 judges "YES", and proceeds to the step S28. On the other hand, when having not received the T-lapse trigger, the dressing controller 14 judges "NO", and returns to the step S72.

Thus, in the present embodiment, the dressing controller 14 successively changes the rotational speed of the cutter 16 during the currently-executed dressing operation, on the basis of the dressing amount measured in the currently-executed dressing operation. Due to this feature, it is possible to appropriately adjust the dressing amount of the fixed electrode 50 and the movable electrode 52 during the execution of the dressing operation.

Therefore, the movable electrode 52 and the fixed electrode 50 can be dressed not excessively and not insufficiently, so the electrode can be dressed so as to maintain the quality of welding while preventing the electrode from being worn quickly.

Further, in the present embodiment, the average dressing amount $\xi_{ave}$ is measured as the dressing amount to be measured during the dressing operation. Due to this feature, it is possible to improve the reliability of the dressing amount measurement for the fixed electrode 50 and the movable electrode 52.

Figure 11:
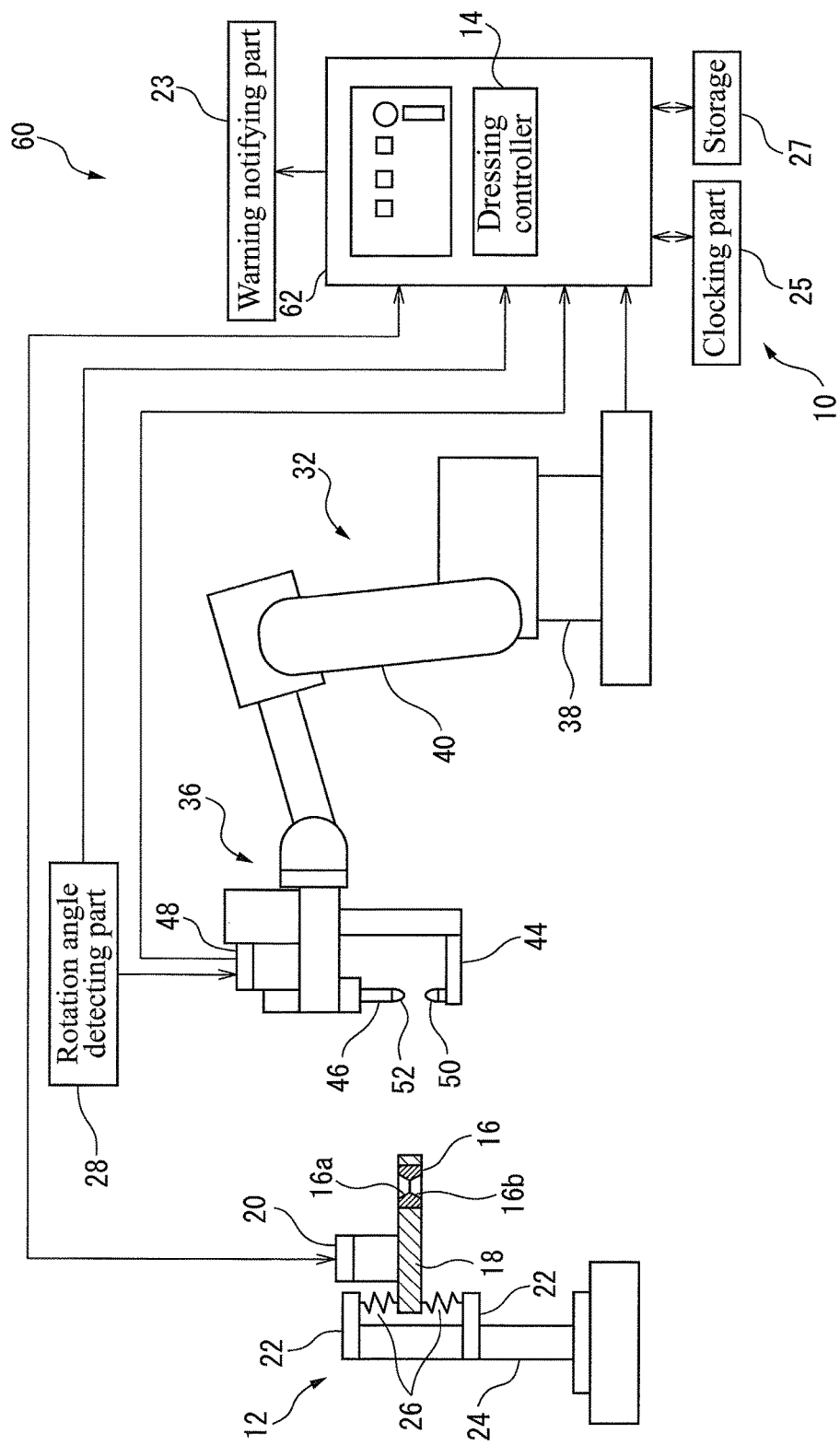
FIG. 11 is a block diagram of the dressing system and spot welding system according to another embodiment of the invention.

In the above-mentioned embodiment, a case has been described where the dressing controller 14 is provided as an element separate from the robot controller 34. However, the dressing controller 14 may be incorporated into the robot controller. An embodiment having such configuration will be described below, with reference to FIG. 11. Note that, elements similar to those in the above embodiment are assigned same reference numerals, and detailed descriptions thereof will be omitted.

The dressing system 10 includes a dressing device 12, a dressing controller 14, a rotation angle detecting part 28, a storage 27, a warning notifying part 23, and a clocking part 25. The spot welding system 60 includes a robot 32, a robot controller 62, and a spot welding gun 36.

The dressing controller 14 is incorporated into the robot controller 62, and the robot controller 62 performs the function of the dressing controller 14. The servo motor 20 of the dressing device 12, the rotation angle detecting part 28, the storage 27, the warning notifying part 23, and the clocking part 25 are communicably connected to the robot controller 62, and operate in accordance with a command from the robot controller 62, similar as the above-described embodiment.

Figure 9:
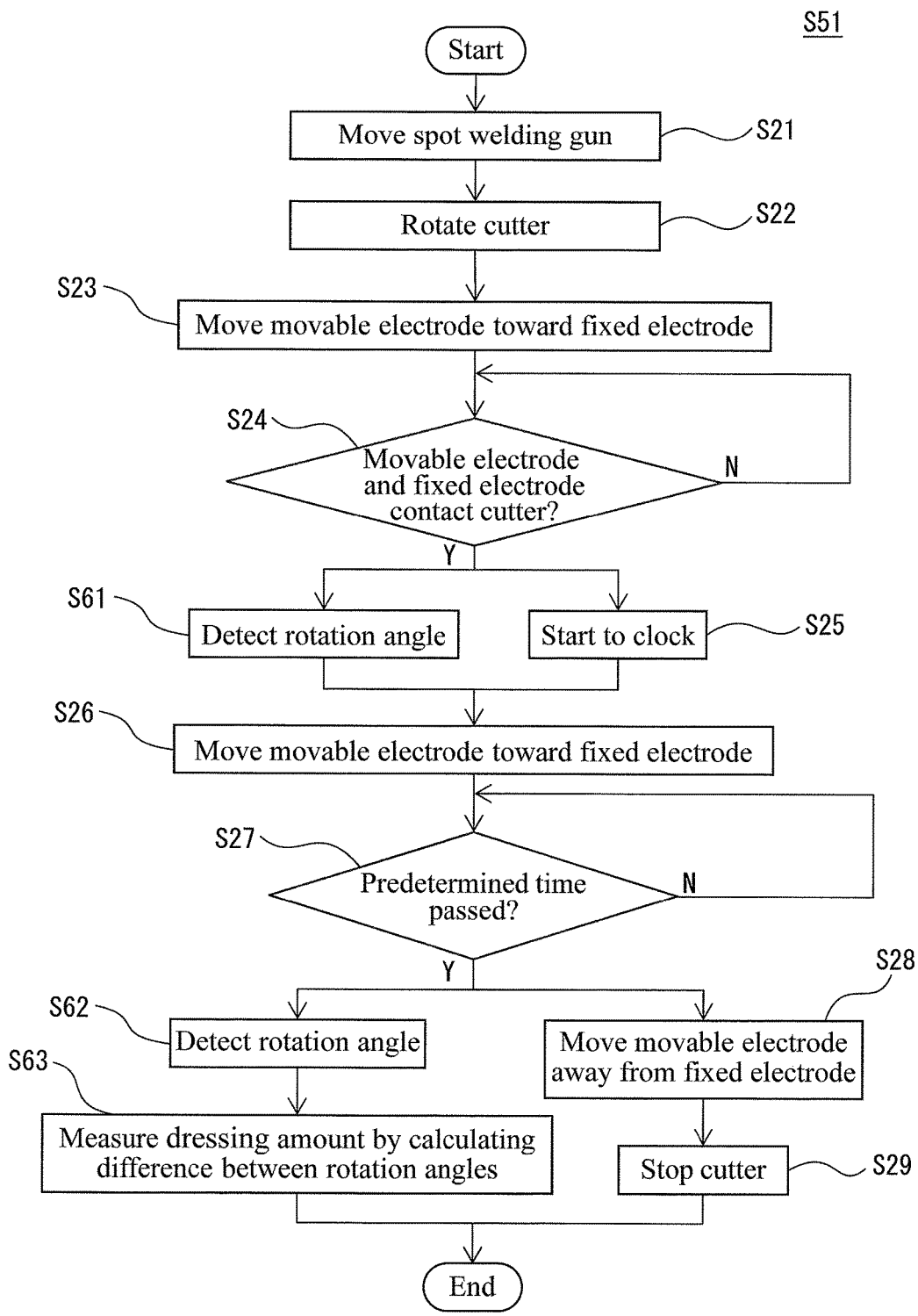
FIG. 9 is a flow chart of an example of the step S51 in FIG. 8.

Note that, in the above embodiment, a case has been described where, in the step S51 in FIG. 9, the dressing controller 14 detects the rotation angle $\theta_S$ and the rotation angle $\theta_E$ at two time points, i.e., at the start and the end of the dressing operation, at the steps S61 and S62.

However, the dressing controller 14 may detect the rotation angles at a plurality of time points in the period of time from the start to the end of the dressing operation. For example, the dressing controller 14 may perform operations such as the above steps S72 and S73 in FIG. 10 between the steps S26 and S27 in FIG. 9.

In this case, the dressing controller 14 detects the rotation angles at a cycle τ from the start to the end of the dressing operation. Then, at the step S63 in FIG. 9, the dressing controller 14 may measure the dressing amount by calculating the difference $\phi_m$ between the rotation angles detected at two time points which are consecutive in time series (i.e., at a time point when a time (m−1)τ has passed from the start of clocking, and at a time point after a time mτ has passed from the start of clocking).

Further, a case has been described where, at the step S35 in FIG. 6 and the step S63 in FIG. 9, the dressing controller 14 measures the dressing amount ξ of the movable electrode 52 and the fixed electrode 50 by calculating the difference φ between the rotational speeds.

However, instead of the above-mentioned steps S35 and S63, the dressing controller 14 may integrate the differences φ between rotation angles and measure the average dressing amount $\xi_{ave}$ by dividing the integrated value Σφ of the differences by the number of times that the differences φ are calculated, as in the steps S74 to S76 in FIG. 10.

Further, in the above-described embodiment, a case has been described where the movable arm 46 is driven by the servo motor 48 and the rotation angle of the servo motor 48 is detected by the rotation angle detecting part 28 in order to detect the position of the electrode.

However, instead of the servo motor 48, a device capable of linearly driving the movable arm 46 along the gun axis O, such as a linear motor or a cylinder, may be applied. In this case, the dressing system 10 may include a position sensor capable of detecting a displacement (e.g., unit: [mm]) of the movable arm 46 along the gun axis O as a means for detecting the electrode position, instead of the rotation angle detecting part 28.

Further, in the above-described embodiment, a case has been described where the movable arm 46 is provided on the base 42 to be movable along the gun axis O. However, the movable arm may be rotatably provided on the base 42.

Figure 2:
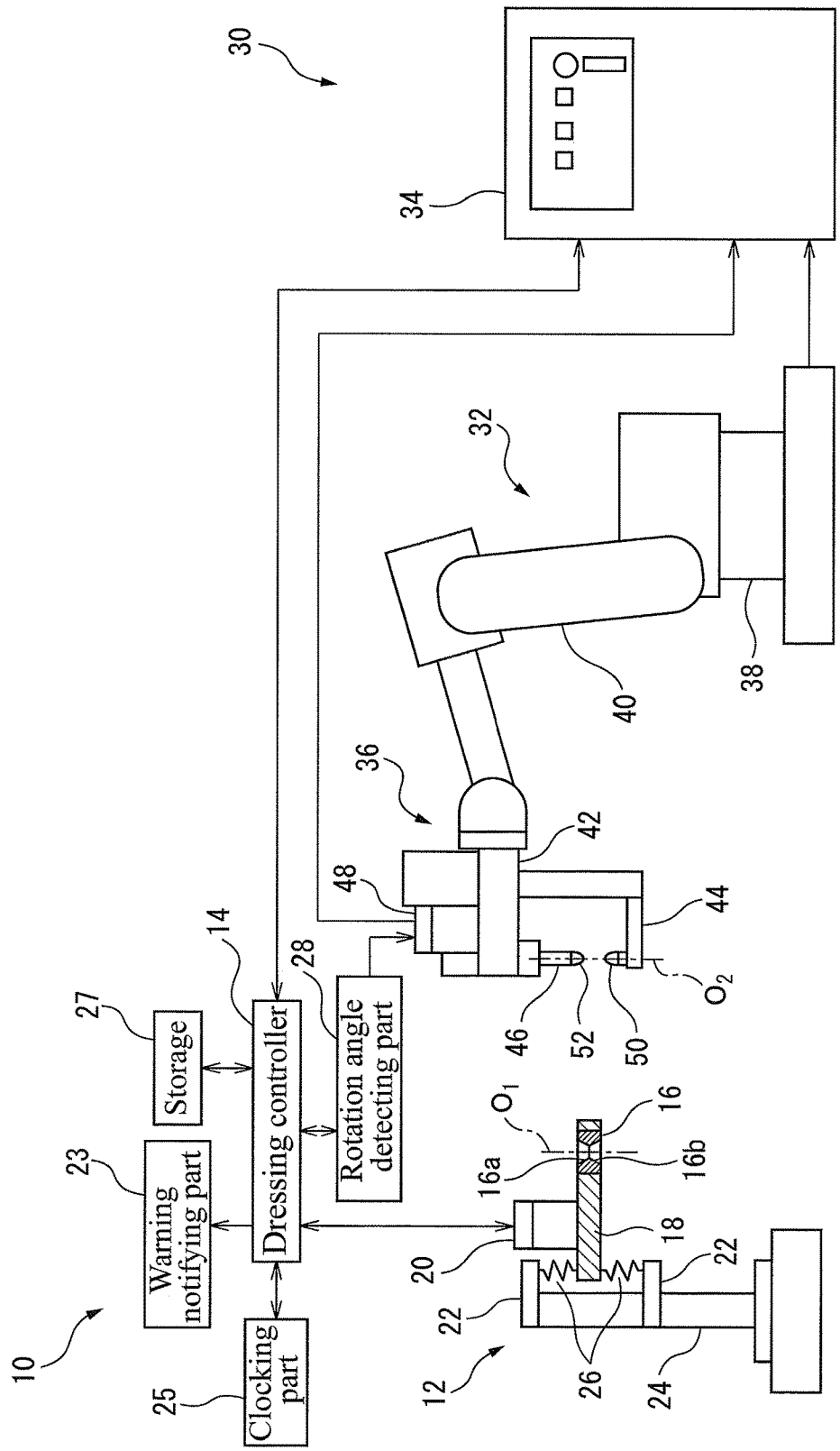
FIG. 2 is a block diagram of the dressing system illustrated in FIG. 1 and the spot welding system according to an embodiment of the invention.

For example, the movable arm can be rotated by the servo motor 48 about a rotation axis provided on the base 42 (e.g., an axis disposed perpendicular to FIG. 2). In this case, as the movable arm is rotated, the movable electrode 52 provided on the movable arm reciprocates in directions toward and away from the fixed electrode 50 along a circumferential direction of a circle centered about the rotation axis.

Further, in the above-described embodiment, a case has been described where the spot welding gun 36 is a so-called C-type spot gun. However, the spot welding gun may be a so-called X-type spot gun comprising a pair of gun arms which can open and close under the action of a pressure cylinder, and to each of which an electrode is attached.

Further, in the above-described embodiment, a case has been described where both of the movable electrode 52 and the fixed electrode 50 are dressed by the cutter 16, and the dressing amount of the movable electrode 52 and of the fixed electrode 50 in measured. However, only one of the movable electrode 52 and the fixed electrode 50 may be dressed by the cutter 16, and the dressing amount of only one of the movable electrode 52 and the fixed electrode 50 may be measured.

Further, in the above-described embodiment, a case has been described where the dressing system 10 includes the storage 27. However, the dressing system 10 may not include the storage 27, and transmit data of the rotation angle or the like to an external device via a network so as to record it in the external device.

Figure 12:
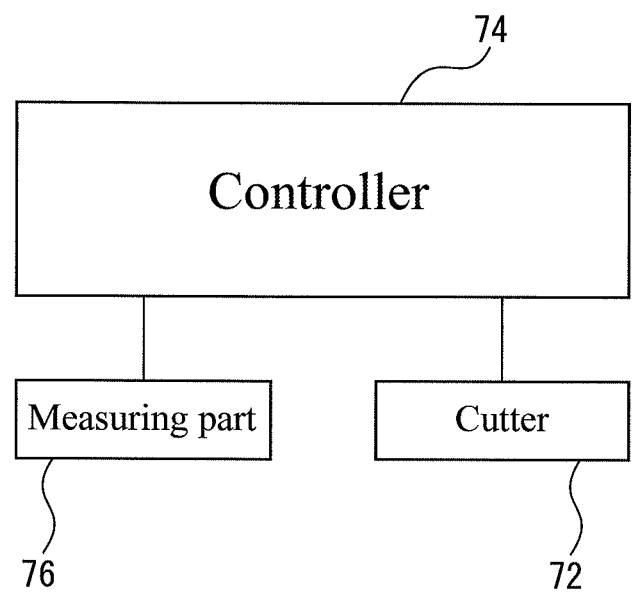
FIG. 12 is a block diagram of the dressing system according to still another embodiment of the invention.

Further, in the above-described embodiment, a case has been described where the dressing system 10 includes the dressing device 12, the dressing controller 14, the rotation angle detecting part 28, the storage 27, the warning notifying part 23, and the clocking part 25. However, the invention should not be limited thereto. A dressing system 70 according to still another embodiment of the invention will be described below, with reference to FIG. 12.

The dressing system 70 includes a cutter 72, a controller 74, and a measuring part 76. The cutter 72 dresses an electrode of a spot welding gun such as the fixed electrode 50 and the movable electrode 52, described above.

The controller 74 controls the rotation of the cutter 72. The measuring part 76 measures the dressing amount of the electrode when the electrode is dressed by the cutter 72. That is, the dressing controller 14 and the rotation angle detecting part 28 in the above-described embodiment correspond to the measuring part 76.

The controller 74 determines the rotational speed of the cutter 72 based on the dressing amount measured by the measuring part 76. That is, the dressing controller 14 in the above-described embodiment corresponds to the controller 74. According to the dressing system 70 of the present embodiment, the controller 74 can flexibly control the rotational speed of the cutter 72 in response to the dressing amount measured by the measuring part 76, so it is possible to appropriately control the dressing amount.

Although, in the foregoing, the invention has been described with respect to embodiments thereof, the invention defined in the appended claims is by no means limited to the embodiments described above. Further, any combination of the features described in the embodiments of the invention falls within the technical scope of the invention. However, all combinations of such features are not necessarily essential to the solving means of the invention. Further, it will also be apparent to those skilled in the art that various changes or improvements can be applied to the embodiments described above.

Further, it should be noted that the execution order of the respective processings such as the operation, procedure, step, process, stage, or the like in the device, system, program, and method illustrated in the claims, specification, and drawings can be realized in any sequence unless specifically indicated as "before", "prior to", or the like or unless the output of the previous processing is used in the subsequent processing. Regarding the flow of operation in the claims, specification and drawings, even if it is explained using "first", "next", "then" or the like, this does not mean that the execution in this order is essential.

What is claimed is:

1. A dressing system for dressing an electrode of a spot welding gun, comprising:
    a cutter having a cutter axis which is aligned with an electrode axis to dress the electrode;
    a controller which controls rotation of the cutter around the cutter axis; and
    a measuring part which measures a dressing amount of the electrode along the electrode axis based on detecting an electrode position, wherein the electrode position is detected based on either a rotation angle of a servo motor or a position of a linear actuator which is used to facilitate a reciprocating movement of the electrode along the electrode axis,
    wherein the controller determines a rotational speed of the cutter based on the dressing amount measured by the measuring part, and
    wherein the controller:
        judges whether the dressing amount measured along the electrode axis by the measuring part is between a predetermined first threshold value and a predetermined second threshold value greater than the first threshold value,
        determines the rotational speed so as to be higher than the rotational speed at the time of measurement of the dressing amount along the electrode axis, when judging that the dressing amount along the electrode axis is smaller than the first threshold value, and
        determines the rotational speed so as to be lower than the rotational speed at the time of measurement of the dressing amount along the electrode axis, when judging that the dressing amount along the electrode axis is greater than the second threshold value.

2. The dressing system according to claim 1, wherein, on the basis of the dressing amount measured in a first dressing operation, the controller determines the rotational speed in a second dressing operation to be performed subsequently to the first dressing operation.

3. The dressing system according to claim 2, wherein the measuring part
    detects an electrode position each time the dressing operation is completed; and
    measures the dressing amount by calculating a difference between the electrode position detected when the first dressing operation is completed and the electrode position detected when a third dressing operation is completed, the third dressing operation performed before the first dressing operation.

4. The dressing system according to claim 2, wherein the measuring part
    detects electrode positions at a plurality of time points in a period of time from a start to an end of the first dressing operation; and
    measures the dressing amount by calculating a difference between the electrode positions detected at two of the time points which are consecutive in time series.

5. The dressing system according to claim 4, wherein the plurality of time points are two time points at the start and the end of the first dressing operation.

6. The dressing system according to claim 4, wherein the measuring part
    integrates a plurality of differences between the electrode positions calculated during the period of time from the start to the end of the first dressing operation; and
    measures the dressing amount by dividing the integrated value by a number of the plurality of differences calculated.

7. The dressing system according to claim 1, wherein, on the basis of the dressing amount measured during performing a dressing operation, the controller determines the rotational speed in the dressing operation after the measurement of the dressing amount.

8. The dressing system according to claim 7, wherein the measuring part
    detects an electrode position each time a predetermined time passes after a start of the dressing operation; and
    measures the dressing amount by calculating a difference between a first electrode position detected most recently and a second electrode position detected before the first electrode position.

9. The dressing system according to claim 8, wherein the measuring part
    integrates a plurality of differences between the electrode positions each time the difference is calculated; and
    measures the dressing amount by dividing the integrated value by a number of the plurality of differences calculated.

10. The dressing system according to claim 1, wherein the controller
    determines the rotational speed so as to be higher than the rotational speed at the time of measurement of the dressing amount by a predetermined speed, when judging that the dressing amount is smaller than the first threshold value; or
    determines the rotational speed so as to be lower than the rotational speed at the time of measurement of the dressing amount by a predetermined speed, when judging that the dressing amount is greater than the second threshold value.

11. The dressing system according to claim 1, wherein the controller
    determines the rotational speed so as to be higher than the rotational speed at the time of measurement of the dressing amount by a speed which depends on a difference between the dressing amount and the first threshold value, when judging that the dressing amount is smaller than the first threshold value; or determines the rotational speed so as to be lower than the rotational speed at the time of measurement of the dressing amount by a speed which depends on a difference between the dressing amount and the first threshold value, when judging that the dressing amount is greater than the second threshold value.

12. The dressing system according to claim 1, wherein the controller judges whether the determined rotational speed is within a predetermined range when determining the rotational speed; and determines the rotational speed so as to be within the predetermined range or does not change the rotational speed, when judging that the determined rotational speed is out of the predetermined range.

13. The dressing system according to claim 12, further comprising a warning notifying part which notifies a warning to a user when the controller judges that the determined rotational speed is out of the predetermined range.

14. The dressing system according to claim 1, wherein the measuring part detects a rotational position of a servo motor provided at the spot welding gun in order to move the electrode; and measures the dressing amount based on the rotational position.

\* \* \* \* \*